3,553,208
PROCESS FOR MAKING QUINOXALINE-
DI-N-OXIDES
Eli Abushanab, Groton, Conn., assignor to Chas. Pfizer
& Co., Inc., New York, N.Y., a corporation of Delaware
No Drawing. Filed July 5, 1968, Ser. No. 742,513
Int. Cl. C07d 51/78
U.S. Cl. 260—250                 14 Claims

ABSTRACT OF THE DISCLOSURE

A novel process consisting of the reaction between an o-quinonedioxime and a reagent such as an α-dicarbonyl compound, an α-hydroxycarbonyl compound, an α-halocarbonyl compound, an α-epoxycarbonyl compound or an α-epoxy halide.

BACKGROUND OF THE INVENTION

This invention relates to a novel synthetic procedure and, more particularly, to a novel method for the preparation of quinoxaline-di-N-oxides. The compounds prepared by the novel subject process are useful in the control of various pathogenic microorganisms. Quinoxaline-di-N-oxides in general are known to possess gram-negative antibacterial activity. For instance, several quinoxaline-di-N-oxides bearing 2-alkyl or 2,3-dialkyl groups has been described by Lundquist et al., U.S. Pat. 2,626,259 issued Jan. 20, 1953, and by Wiedling, Acta Pathol, et Microbiol. Scand. 22, 379–91 (1945). McIlwain, J. Chem. Soc. 322 (1943) and King et al., J. Chem. Soc. 3012 (1949), disclose the antibacterial activity of 2-methyl - 3 - n - amyl-quinoxaline-di-N-oxide and of several 6-substituted quinoxaline-di-N-oxides, respectively.

SUMMARY OF THE INVENTION

Accordingly, a general organic synthetic method is disclosed for the preparation of the subject compounds which comprises reacting an o-quinonedioxime with the following reagents shown herein below to provide the indicated products:

(A)

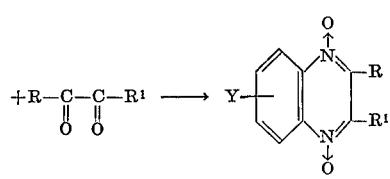

(B)

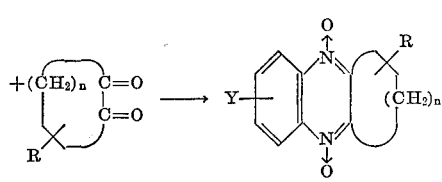

(C)

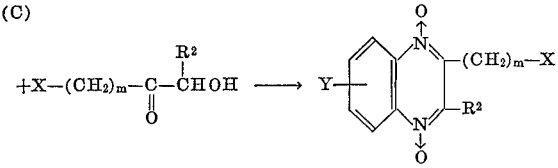

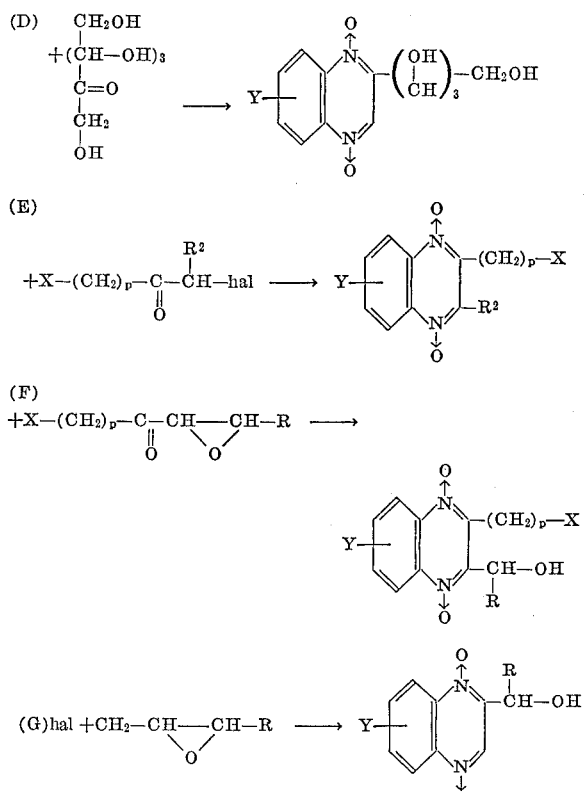

wherein Y can be hydrogen and other simple substituents usually found on benzene rings, that is, alkyl, alkoxy, halo, etc. and R and $R^1$ are each hydrogen or alkyl of from 1 to 12 carbon atoms, $n$ is an integer from 2 to 18, X is hydrogen, hydroxy, mercapto, amino, alkyloxy and alkylsulfonyl, said alkyl groups containing from 1 to 4 carbon atoms, $m$ is an integer from 2 to 12 hal is a halogen atom and $p$ is an integer from 2 to 12.

It should be noted that this is a basic reaction which takes place between an o-quinonedioxime with the reagents shown above. That is to say, the type of o-quinonedioxime, whether substituted or not, will have no effect on the overall reaction sequence and will only determine the type of final product obtained.

DETAILED DESCRIPTION OF THE INVENTION

Concerning the o-quinonedioxime reagent also known as o-benzoquinone-dioxime, it is found that substituted derivatives will work equally as well as o-quinonedioxime itself. Thus, o-quinonedioxime or a substituted o-quinonedioxime may be employed in the process of the present invention. Such compounds are either readily available or easily prepared by one skilled in the art. One simple means for obtaining such derivatives is by a reduction of the corresponding isobenzofuroxan. A review article entitled "The Furoxans" by J. V. R. Kaufman and J. P. Picard in Chemical Reviews, vol. 59, page 448 (1959) refers to the preparation of many substituted isobenzofuroxans which can then be reduced to prepare the starting reagents of the herein disclosed process.

With respect to the other reagent used in the herein disclosed process, there are five categories of reagents which are found to be suitable and applicable to the process of this invention. Namely, they are α-dicarbonyl compounds, α-hydroxycarbonyl compounds, α-halocarbonyl compounds, α-epoxycarbonyl compounds and α-epoxy halides. These categories are depicted in the reaction sequences shown above. Despite the fact that this reaction is general and basic for these particular reagents, the products themselves, that is the resulting quinoxaline-di-N-oxide, will have substituents on the quinoxaline nucleus dependent on the nature of the second reagent. For example, a non-cyclic α-dicarbonyl compound will provide a 2,3-dialkylquinoxaline-di-N-oxide. On the other hand, an alkyl α-ketoaldehyde will give rise to 2-alkyl, 3-hydroxyquinoxaline - di - N-oxide. In like manner, an alkyl α-epoxy halide will provide a 2-alkyl-3-hydroxymethylquinoxaline-di-N-oxide.

It is therefore apparent by simple inspection that the product which one obtains as well as the ultimate position of the substituent coming from the second reagent is dependent upon the particular carbonyl-containing compound (second reagent) utilized.

As for the inclusion of a solvent in the basic process of this invention, this will not be a critical factor and its desirability will depend on many factors. For instance, if a sizable amount of liquid amine is used, there may not be any need to use a solvent. If, however, the reactants when combined produce a viscous system, it is highly desirable to include an appropriate solvent. For purposes of this invention, an appropriate solvent is any solvent which does not react in an undesired way with either of the reactants or the final products. One of the advantages in including a solvent is that when certain reflux temperatures are desired, by choosing the appropriate solvent, the desired elevated reaction temperature can be attained. Reaction temperatures do not appear to be critical in the present process although it is generally preferred to carry out the reaction at temperatures above room temperatures. A preferred range is from about 30° C. to about 100° C. Temperatures below 30° C. may be employed, for instance, 0° C. to 30° C., but are less preferred.

With regard to the isolation of the desired products of this invention, it is found in many instances that in the course of or upon completion of reaction the product precipitates out in crystalline form. In such cases, all that is required is filtration, washing and drying. If, on the other hand, the product does not completely precipitate or if it remains in solution, the reaction workup consists of evaporating the mixture almost to dryness and then filtering the product. If the sodium salt of the product forms, as it does in certain instances, the general procedure consists of filtering said salt, dissolving it in water, acidifying the solution and subsequently filtering the product which forms. All of the above techniques are well known to trained technicians working in the organic laboratory.

The vertification that the herein disclosed compounds are effective antimicrobial agents is established by experimental evaluations. One such in-vitro evaluation consists of seeding nutrient broth containing various concentrations of the subject compounds with a particular organism and subsequently determining the minimum concentration of the antimicrobial test compound (in micrograms/milliliter) at which growth of the microorganism failed to occur. For instance, the following is only a representative list of compounds disclosed herein which have exhibited in-vitro activity in the above described procedure:

2-methylquinoxaline-di-N-oxide
2,3-dimethylquinoxaline-di-N-oxide
2-methyl-3-hydroxyquinoxaline-di-N-oxide Illustrative MIC values are shown in the examples. It should be understood that these are only representative illustrations and are provided to show typical desirable results.

Since all of the products of the present invention possess in vitro activity against harmful microorganisms, they are useful as industrial antimicrobials, for instance, water-treatment, slime-control, paint preservation, wood preservation, etc., as well as for topical application purposes, for example disinfectants, etc. In the latter application, it will often be convenient to compound the selected product with a pharmaceutically-acceptable carrier for ease in application. Thus, for example, they may be blended with vegetable or mineral oils or incorporated in emollient creams. Similarly, they may be dissolved or dispersed in liquid carriers or solvents such as water, alcohol, glycols or mixtures thereof or other reaction-inert media, that is media which have no harmful effect on the active ingredient. For such purposes, it will generally be acceptable to employ concentrations of active ingredients of from about 0.01% to about 10% by weight based on total composition.

Furthermore, the showing of in vitro antimicrobial activity finds particular utility in the growth promotion of animals in the control of chronic respiratory disease in poultry, infectious sinusitis in turkeys, and urinary tract and systemic and non-systemic infections in animals, including man.

The following examples are given to illustrate further the scope of the present invention, but should not be interpreted as limiting the scope thereof.

EXAMPLE I 2,3-dimethylquinoxaline-di-N-oxide

A mixture containing o-quinonedioxime (1.38 g., 0.01 M), diacetyl (1.46 g., 0.01 M) and 30 ml. of tetrahydrofuran is allowed to reflux on a steam bath overnight. The solid product which precipitates is filtered and recrystalized from a chloroform-hexane (1:1 mixture), melting point 190–192° C.

EXAMPLE II

The procedure of Example I is repeated wherein stoichiometric equivalent amounts of the α-diketones shown herein below are used in place of diacetyl to provide the indicated products in good yields:

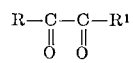

| α-Diketone | | Product |
|---|---|---|
| R | R¹ | |
| $C_2H_5$ | $C_2H_5$ | 2,3-diethylquinoxaline-di-N-oxide. |
| n-$C_4H_9$ | n-$C_4H_9$ | 2,3-di-n-butylquinoxaline-di-N-oxide. |
| n-$C_6H_{13}$ | n-$C_6H_{13}$ | 2,3-di-n-hexylquinoxaline-di-N-oxide. |
| n-$C_{12}H_{25}$ | n-$C_{12}H_{25}$ | 2,3-di-n-dodecylquinoxaline-di-N-oxide. |
| $CH_3$ | $C_2H_5$ | 2-methyl-3-ethylquinoxaline-di-N-oxide. |

EXAMPLE III 2-methyl-3-hydroxyquinoxaline-di-N-oxide

A mixture containing pyruvaldehyde (2 ml. of a 40% aqueous solution), o-quinone-dioxime (1.38 g.) and tetrahydrofuran 40 ml. is stirred at room temperature overnight. The product which precipitates is filtered and recrystallized from methanol to yield the desired product having a melting point 231–232° C.

*Analysis.*—Calc. for $C_9H_8N_2O_3$ (percent): C, 56.25; H, 4.20; N, 14.55. Found (percent): C, 56.77; H, 4.44; N, 14.44.

EXAMPLE IV

The procedure of Example III is repeated wherein stoichiometric equivalent amounts of the α-ketoaldehydes shown herein below are used in place of pyruvaldehyde to provide the products indicated in good yields:

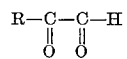

α-Ketoaldehyde R:     Product
    $C_2H_5$ — 2-ethyl-3-hydroxyquinoxaline-di-N-oxide.
    n-$C_4H_9$ — 2-n-butyl-3-hydroxyquinoxaline-di-N-oxide.
    n-$C_6H_{13}$ — 2-n-hexyl-3-hydroxyquinoxaline-di-N-oxide.
    n-$C_{12}H_{25}$ — 2-n-dodecyl-3-hydroxyquinoxaline-di-N-oxide.

EXAMPLE V

2-hydroxyquinoxaline-di-N-oxide

A mixture containing o-quinone-dioxime (1.38 g., 0.01 mol), glyoxal (2 ml. of a 30% aqueous solution) and 400 ml. of tetrahydrofuran allowed to stand overnight. The reaction mixture is then evaporated almost to dryness, acetone (25 ml.) is added and the solid product is filtered. The desired product has a melting point of 240–245° C.

*Analysis.*—Calc. for $C_8H_6N_2O_3$ (percent): C, 53.93; H, 3.37; N, 15.17. Found (percent): C, 53.82; H, 3.37; N, 15.37.

EXAMPLE VI

2,3-tetramethylenequinoxaline-di-N-oxide

A mixture containing o-quinonedioxime (1.38 g., 0.01 M), cyclohexane-1,2-dione (1.12 g., 0.01 M) and 40 ml. of tetrahydrofuran is allowed to stand over night. The resulting mixture is evaporated to dryness and the solid product is collected, washed and dried to provide the desired product.

EXAMPLE VII

The procedure of Example VI is repeated wherein stoichiometric equivalent amounts of the cyclic α-diketones listed herein below are used in place of cyclohexane-1,2-dione to provide the products indicated in good yields:

Cyclic α-diketone:  Product
 $n=3$____  2,3-trimethylenequinoxaline-di-N-oxide.
 $n=8$____  2,3-octamethylenequinoxaline-di-N-oxide.
 $n=10$___  2,3-decamethylenequinoxaline-di-N-oxide.
 $n=18$___  2,3-octadecylmethylenequinoxaline-di-N-oxide.

EXAMPLE VIII

2-methylquinoxaline-di-N-oxide

A mixture containing o-quinonedioxime (1.38 g., 0.1 M), acetol (0.01 M) and 20 ml. of tetrahydrofuran is allowed to stand overnight. The solid precipitate is filtered, washed and dried to yield the desired product having a melting point 178–179° C.

EXAMPLE IX

The procedure of Example VIII is repeated wherein stoichiometric equivalent amounts of the α-hydroxycarbonyl compounds listed herein below are used in place of acetol to provide the indicated products in good yields:

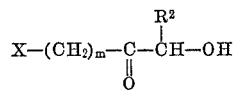

| α-Hydroxycarbonyl compound | | | Product |
|---|---|---|---|
| X | m | $R^2$ | |
| —H | 2 | H | 2-ethylquinoxaline-di-N-oxide. |
| —H | 4 | H | 2-butylquinoxaline-di-N-oxide. |
| —H | 12 | H | 2-dodecylquinoxaline-di-N-oxide. |
| —OH | 6 | H | 2-(6-hydroxyhexyl)quinoxaline-di-N-oxide. |
| —SH | 2 | H | 2-(β-thioethyl)quinoxaline-di-N-oxide. |
| —$NH_2$ | 8 | H | 2-(8-aminooctyl)quinoxaline-di-N-oxide. |
| —$OCH_3$ | 2 | H | 2-(methoxyethyl)quinoxaline-di-N-oxide. |
| —$OC_4H_9$ | 3 | H | 2-(3-butoxypropyl)quinoxaline-di-N-oxide. |
| —$SO_2CH_3$ | 4 | H | 2-(4-methylsulfonylbutyl)quinoxaline-di-N-oxide. |
| —$SO_2C_4H_9$ | 2 | H | 2-(butylsulfonylethyl)quinoxaline-di-N-oxide. |
| —H | 2 | —$CH_3$ | 2-ethyl-3-methylquinoxaline-di-N-oxide. |
| —H | 4 | —$C_4H_9$ | 2,3-dibutylquinoxaline-di-N-oxide. |

EXAMPLE X

Quinoxaline-di-N-oxide

A mixture containing o-quinone-dioxime (1.38 g., 0.01 M), glycoaldehyde (0.6 g., 0.01 M) and 20 ml. of tetrahydrofuran is allowed to stir at room temperature overnight. The precipitate which forms is filtered, washed and recrystallized from a chloroform-hexane mixture to give the desired product having a melting point 221–223° C. (MIC against *P. vulgaris* is 12.5 mcg./ml.)

EXAMPLE XI

2-hydroxymethylquinoxaline-di-N-oxide

A mixture containing o-quinonedioxime (6.8 g., 0.05 M), 1,3 - dihydroxy acetone (4.5 g., 0.05 M) and 100 ml. of methanol is stirred and refluxed for 18 hours. The reaction mixture is then evaporated almost to dryness and the solid precipitate is filtered. Recrystallization from methanol yields the desired product having a melting point 198–199° C.

EXAMPLE XII

The procedure of Example I is repeated wherein the following sugars having the α-hydroxycarbonyl configuration listed herein below, in stoichiometric equivalent amounts, are used in place of diacetyl to provide the products indicated in good yields:

Sugar:  Product
 Fructose_____ 2-(1,2,3,4-tetrahydroxybutyl)quinoxaline-di-N-oxide.
 Tagatose_____ 2-(1,2,3,4-tetrahydroxybutyl)quinoxaline-di-N-oxide.
 Glucose_____ 2-(1,2,3-trihydroxypropyl)quinoxaline-di-N-oxide.

EXAMPLE XIII

The procedure of Example I is repeated wherein stoichiometric equivalent amounts of the α-halocarbonyl compounds listed herein below are used in place of diacetyl to provide the products indicated in good yields:

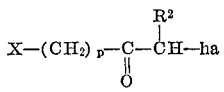

| α-Halocarbonyl compound | | | | Product |
|---|---|---|---|---|
| X | p | hal | $R^2$ | |
| H | 2 | F | H | 2-ethylquinoxaline-di-N-oxide. |
| OH | 2 | Br | H | 2-(hydroxyethyl)quinoxaline-di-N-oxide. |
| SH | 6 | Br | H | 2-(6-thiohexyl)quinoxaline-di-N-oxide. |
| $NH_2$ | 8 | I | H | 2-(8-aminooctyl)quinoxaline-di-N-oxide. |
| Methoxy | 4 | Cl | H | 2-(4-methoxybutyl)quinoxaline-di-N-oxide. |
| $C_4H_9O$ | 10 | Cl | H | 2-(10-butoxydecyl)quinoxaline-di-N-oxide. |
| Methylsulfonyl | 2 | F | H | 2-(2-methylsulfonylethyl)quinoxaline-di-N-oxide. |
| Butylsulfonyl | 3 | I | H | 2-(3-butylsulfonylpropyl)quinoxaline-di-N-oxide. |
| H | 4 | Cl | —$CH_3$ | 2-butyl-3-methylquinoxaline-di-N-oxide. |
| OH | 2 | Br | —$C_4H_9$ | 2-hydroxyethyl-3-butylquinoxaline-di-N-oxide. |

EXAMPLE XIV

The procedure of Example I is repeated wherein stoichiometric equivalent amounts of the α-epoxycarbonyl compounds listed herein below are used in place of diacetyl to provide the products indicated in good yields:

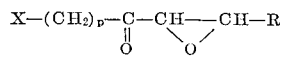

| α-Epoxycarbonyl compound X | p | R | Product |
|---|---|---|---|
| H | 3 | H | 2-propyl-3-hydroxymethylquinoxaline-di-N-oxide. |
| H | 2 | H | 2-ethyl-3-hydroxymethylquinoxaline-di-N-oxide. |
| H | 6 | H | 2-hexyl-3-hydroxymethylquinoxaline-di-N-oxide. |
| H | 12 | H | 2-dodecyl-3-hydroxymethylquinoxaline-di-N-oxide. |
| —OH | 2 | H | 2-(β-hydroxyethyl)-3-hydroxymethylquinoxaline-di-N-oxide. |
| —SH | 2 | H | 2-(2-thioethyl)-3-hydroxymethylquinoxaline-di-N-oxide. |
| —NH$_2$ | 4 | H | 2-(4-aminobutyl)-3-hydroxymethylquinoxaline-di-N-oxide. |
| —OCH$_3$ | 6 | H | 2-(6-methoxyhexyl)-3-hydroxymethylquinoxaline-di-N-oxide. |
| —OC$_4$H$_9$ | 8 | H | 2-(8-butoxyoctyl)-3-hydroxymethylquinoxaline-di-N-oxide. |
| —SO$_2$CH$_3$ | 10 | H | 2-(10-methylsulfonyldecyl)-3-hydroxyquinoxaline-di-N-oxide. |
| —SO$_2$C$_4$H$_9$ | 2 | H | 2-(β-butylsulfonylethyl)-3-hydroxyquinoxaline-di-N-oxide. |
| H | 3 | —CH$_3$ | 2-propyl-3-(α-hydroxyethyl)quinoxaline-di-N-oxide. |
| H | 2 | —C$_5$H$_{11}$ | 2-ethyl-3-(α-hydroxyhexyl)quinoxaline-di-N-oxide. |
| H | 4 | —C$_{11}$H$_{23}$ | 2-butyl-3-(α-hydroxydodecyl)quinoxaline-di-N-oxide. |

EXAMPLE XV

The procedure of Example I is repeated wherein stoichiometric equivalent amounts of the α-epoxyhalides listed herein below are used in place of diacetyl to provide the products indicated in good yields:

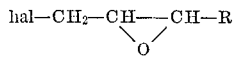

| α-Epoxyhalide compound hal | R | Product |
|---|---|---|
| Cl | H | 2-hydroxymethylquinoxaline-di-N-oxide. |
| Br | —CH$_3$ | 2-(α-hydroxyethyl)quinoxaline-di-N-oxide. |
| I | —C$_2$H$_5$ | 2-(α-hydroxypropyl)quinoxaline-di-N-oxide. |
| F | —C$_4$H$_9$ | 2-(α-hydroxypentyl)quinoxaline-di-N-oxide. |
| Cl | —C$_9$H$_{19}$ | 2-(α-hydroxydecyl)quinoxaline-di-N-oxide. |

EXAMPLE XVI

The procedure of Example I is repeated wherein the following dioximes are used, in stoichiometric equivalent amounts, in place of o-quinonedioxime to provide the corresponding products in good yields:

| Dioxime: | Product |
|---|---|
| 3-ethyl-o-quinonedioxime. | 5-ethyl-2,3-dimethylquinoxaline-di-N-oxide. |
| 3-methoxy-o-quinonedioxime. | 5-methoxy-2,3-dimethylquinoxaline-di-N-oxide. |
| 3-bromo-o-quinonedioxime. | 5-bromo-2,3-dimethylquinoxaline-di-N-oxide. |

What is claimed is:

1. A process for preparing a quinoxaline-di-N-oxide which comprises reacting an o-quinonedioxime of the formula:

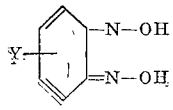

wherein Y is hydrogen, alkyl, alkoxy or halo with a reagent selected from the group consisting of:

(a) 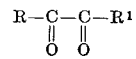

wherein R and R$^1$ are each selected from the group consisting of hydrogen and alkyl containing from 1 to 12 carbon atoms (b) 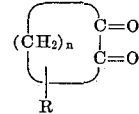

wherein R is as aforesaid and $n$ is an integer of from 2 to 18;

(c) 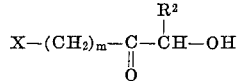

wherein X is selected from the group consisting of hydrogen, hydroxy, mercapto, amino and alkoxy and alkyl containing from 1 to 4 carbon atoms, R$^2$ is selected from the group consisting of hydrogen and alkyl containing from 1 to 4 carbon atoms and $m$ is zero when X is hydrogen or otherwise is an integer of from 2 to 12;

(d) 1,3-dihydroxyacetone;

(e) α-hydroxycarbonyl containing sugar, (f) 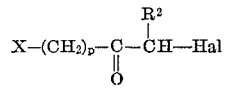

wherein X and R$^2$ are as aforesaid, $p$ is an integer from 2 to 12 and Hal is halogen;

(g) 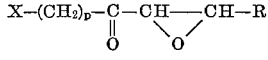

wherein R, X and $p$ are as aforesaid and (h) 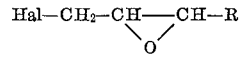

wherein R and Hal are as aforesaid.

2. The process of claim 1 wherein said selected reagent is (a).

3. The process of claim 2 wherein R is methyl and $R^1$ is hydrogen.

4. The process of claim 1 wherein said selected reagent is (b).

5. The process of claim 1 wherein said selected reagent is (c).

6. The process of claim 5 wherein X is mercapto, $R^2$ is hydrogen and $m$ is 2.

7. The process of claim 1 wherein said selected reagent is (d).

8. The process of claim 1 wherein said selected reagent is (e).

9. The process of claim 8 wherein said reagent (e) is selected from the group consisting of fructose, tagatose and glucose.

10. The process of claim 1 wherein said selected reagent is (f).

11. The process of claim 1 wherein said selected reagent is (g).

12. The process of claim 11 wherein each of X and R is hydrogen and $p$ is 2.

13. The process of claim 1 wherein said selected reagent is (h).

14. The process of claim 13 wherein Hal is chlorine and R is hydrogen.

References Cited

UNITED STATES PATENTS 3,260,720   7/1966   Berndt _____ 260—250

NICHOLAS S. RIZZO, Primary Examiner

U.S. Cl. X.R.

424—250

UNITED STATES PATENT OFFICE
CERTIFICATE OF CORRECTION

Patent No. 3,553,208      Dated January 5, 1971

Inventor(s) Eli Abushanab

It is certified that error appears in the above-identified patent and that said Letters Patent are hereby corrected as shown below:

Col. 2, line 30, "(G)hal + CH$_2$-CH-CH-R" should read

-- (G) + hal-CH$_2$-CH-CH-R --.

Col. 6, line 61, that portion of the formula reading "-ha" should read -- -hal --.

Col. 7, line 72, "-N-OH" should read -- =N-OH --.

Signed and sealed this 29th day of June 1971.

(SEAL)
Attest:

EDWARD M. FLETCHER, JR.
Attesting Officer

WILLIAM E. SCHUYLER, JR
Commissioner of Patents